(12) United States Patent
Yavuz et al.

(10) Patent No.: US 11,159,436 B2
(45) Date of Patent: Oct. 26, 2021

(54) MECHANISM FOR AIR INTERFACE DELAY ADJUSTMENT

(71) Applicant: Telefonaktiebolaget LM Ericsson (publ), Stockholm (SE)

(72) Inventors: Emre Yavuz, Stockholm (SE); Anders K. Eriksson, Uppsala (SE); Gunnar Bergquist, Kista (SE); Mattias Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 16/347,222

(22) PCT Filed: Nov. 3, 2017

(86) PCT No.: PCT/IB2017/056884
§ 371 (c)(1),
(2) Date: May 3, 2019

(87) PCT Pub. No.: WO2018/083653
PCT Pub. Date: May 11, 2018

(65) Prior Publication Data
US 2019/0288953 A1    Sep. 19, 2019

Related U.S. Application Data

(60) Provisional application No. 62/417,937, filed on Nov. 4, 2016, provisional application No. 62/449,943, filed on Jan. 24, 2017.

(51) Int. Cl.
*H04L 12/841*    (2013.01)
*H04W 76/28*    (2018.01)
(Continued)

(52) U.S. Cl.
CPC ........ *H04L 47/283* (2013.01); *H04L 43/0858* (2013.01); *H04L 47/18* (2013.01);
(Continued)

(58) Field of Classification Search
CPC ............. H04W 76/28; H04W 28/0268; H04W 28/0236; H04W 28/0257; H04W 72/0406;
(Continued)

(56) References Cited

U.S. PATENT DOCUMENTS

2013/0044582 A1   2/2013  Ahmed
2013/0242889 A1*  9/2013  Khoryaev ........ H04N 21/25841
                                                   370/329
(Continued)

FOREIGN PATENT DOCUMENTS

RU    2332705 C2    8/2008
WO    2013189025 A1   12/2013

OTHER PUBLICATIONS

Author Unknown, "Technical Specification Group Radio Access Network; Evolved Universal Terrestrial Radio Access (E-UTRA); LTE coverage enhancements (Release 11)," Technical Report 36.824, Version 11.0.0, 3GPP Organizational Partners, Jun. 2012, 18 pages.
(Continued)

*Primary Examiner* — Elton Williams
(74) *Attorney, Agent, or Firm* — Withrow & Terranova, PLLC

(57) ABSTRACT

Apparatus and methods are provided for a wireless device and an access node connected with each other over a wireless connection that has a configured packet delay budget and that transports a packet flow established between the wireless device and another device. In response to determining that the packet delay budget of the wireless connection should be adjusted based on end-to-end packet delay measurement performed by the wireless device com-
(Continued)

munication, the wireless device sends an adjustment indication to the access node, where the adjustment indication includes an adjustment value to be applied by the access node in order to change the packet delay budget of the wireless connection. The adjustment value is provided for power saving operation or coverage enhancement of the wireless device.

38 Claims, 8 Drawing Sheets

(51) Int. Cl.
| | | |
|---|---|---|
| *H04L 12/26* | (2006.01) | |
| *H04L 12/801* | (2013.01) | |
| *H04W 28/02* | (2009.01) | |
| *H04W 28/10* | (2009.01) | |
| *H04L 29/06* | (2006.01) | |
| *H04W 28/12* | (2009.01) | |

(52) U.S. Cl.
CPC .......... *H04L 65/4084* (2013.01); *H04L 65/80* (2013.01); *H04W 28/0205* (2013.01); *H04W 28/0257* (2013.01); *H04W 28/0268* (2013.01); *H04W 28/10* (2013.01); *H04W 28/12* (2013.01); *H04W 76/28* (2018.02); *H04L 43/087* (2013.01); *H04L 43/0864* (2013.01); *H04L 43/16* (2013.01); *Y02D 30/70* (2020.08)

(58) Field of Classification Search
CPC ............. H04W 24/02; H04W 52/0235; H04W 52/0261; H04L 47/10; H04L 47/238; H04L 47/18; H04L 43/0858; H04L 43/0864; H04L 43/16; H04L 65/608; H04L 1/1819; H04L 1/189
See application file for complete search history.

(56) References Cited

U.S. PATENT DOCUMENTS

| | | | |
|---|---|---|---|
| 2014/0022909 A1 | 1/2014 | Mahmoud et al. | |
| 2014/0126406 A1 | 5/2014 | Ibanez et al. | |
| 2015/0373774 A1 | 12/2015 | Belghoul et al. | |
| 2018/0338332 A1* | 11/2018 | Lee | H04W 52/0216 |
| 2019/0007855 A1* | 1/2019 | Lee | H04W 28/0236 |

OTHER PUBLICATIONS

Author Unknown, "Technical Specification Group Services and System Aspects; Policy and charging control architecture (Release 14)," Technical Specification 23.203, Version 14.1.0, 3GPP Organizational Partners, Sep. 2016, 253 pages.
Author Unknown, "Technical Specification Group Services and System Aspects; IP Multimedia Subsystem (IMS); Multimedia Telephony; Media handling and interaction (Release 14)," Technical Specification 26.114, Version 14.1.0, 3GPP Organizational Partners, Sep. 2016, 373 pages.
Author Unknown, "Technical Specification Group Services and System Aspects; Terminal acoustic characteristics for telephony; Requirements (Release 13)," Technical Specification 26.131, Version 13.3.0, 3GPP Organizational Partners, Jun. 2016, 71 pages.
Author Unknown, "Technical Specification Group Radio Access Network; Evolved Universal Terrestrial Radio Access (E-UTRA); Physical channels and modulation (Release 14)," Technical Specification 36.211, Version 14.0.0, 3GPP Organizational Partners, Sep. 2016, 170 pages.
Author Unknown, "Technical Specification Group Radio Access Network; Evolved Universal Terrestrial Radio Access (E-UTRA); Physical layer procedures (Release 14)," Technical Specification 36.213, Version 14.0.0, 3GPP Organizational Partners, Sep. 2016, 406 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.4.0, 3GPP Organizational Partners, Dec. 2014, 251 pages.
Author Unknown, "Technical Specification Group Radio Access Network; Evolved Universal Terrestrial Radio Access (E-UTRA); Radio Resource Control (RRC); Protocol Specification (Release 11)," Technical Specification 36.331, Version 11.13.0, 3GPP Organizational Partners, Sep. 2015, 359 pages.
Author Unknown, "IMS Profile for Voice, Video and SMS over Wi-Fi," GSMA Permanent Reference Document, Official Document IR.51, Version 4.0, May 23, 2016, GSM Association, 16 pages.
Author Unknown, "IMS Profile for Voice and SMS," GSMA Permanent Reference Document, Official Document IR.92, Version 10.0, May 19, 2016, GSM Association, 49 pages.
Author Unknown, "IMS Profile for Conversational Video Service," GSMA Permanent Reference Document, Official Document IR.94, Version 11.0, May 24, 2016, GSM Association, 22 pages.
CMCC, et al., "RP-160563: New SI proposal: Study on enhancement of VoLTE," Third Generation Partnership Project (3GPP), TSG RAN Meeting #71, Mar. 7-10, 2016, 7 pages, Göteborg, Sweden.
Ericsson, "R2-167086: VoLTE aspects of the air interface delay," Third Generation Partnership Project (3GPP), TSG-RAN WG2 #95bis, Oct. 10-14, 2016, 4 pages, Kaohsiung, Taiwan.
Qualcomm Inc., "R2-167076: UE Indication of Shortened C-DRX Cycle for VoLTE," Third Generation Partnership Project (3GPP), TSG-RAN WG2 Meeting #95BIS, Oct. 10-14, 2016, 7 pages, Kaohsiung, Taiwan.
RAN2, "R2-168949: Reply LS for Voice and Video enhancement for LTE," Third Generation Partnership Project (3GPP), TSG-RAN WG2 Meeting #96, Nov. 14-18, 2016, 1 page, Reno, USA.
International Search Report and Written Opinion for International Patent Application No. PCT/IB2017/056884, dated Apr. 3, 2018, 11 pages.
Decision to Grant for Russian Patent Application No. 2019117146, dated Mar. 23, 2020, 25 pages.

* cited by examiner

MECHANISM FOR AIR INTERFACE DELAY ADJUSTMENT

RELATED APPLICATIONS

This application is a 35 U.S.C. § 371 national phase filing of International Application No. PCT/IB2017/056884, filed Nov. 3, 2017, which claims the benefit of provisional patent application Ser. No. 62/417,937, filed Nov. 4, 2016, and provisional patent application 62/449,943, filed Jan. 24, 2017, the disclosures of which are hereby incorporated herein by reference in their entireties.

TECHNICAL FIELD

The present disclosure relates generally to time-sensitive packet transmissions over wireless communication networks, round-trip delays and air interface delay adjustment.

BACKGROUND

Group Special Mobile Association, GSMA, has specified industry requirements, IRs, and implementation guidelines for voice and conversational video deployment based on third generation partnership project, 3GPP, specifications. GSMA Permanent Reference Document Industry Requirement 92, GSMA PRD IR. 92 version 10.0 describes industry requirements for Voice over Long Term Evolution, LTE, VoLTE, GSMA PRD IR. 94 version 11.0 describes industry requirements for video over LTE, ViLTE, and GSMA PRD IR.51 describes industry requirements for voice and video over wireless Fidelity, WiFi. VoLTE/ViLTE are key features for LTE to provide voice and video services. With the fast migration from second generation/third generation radio access, 2G/3G, to LTE and the increasing demand for high-quality voice/video services, VoLTE and ViLTE have been deployed and launched by many operators over the world.

For VoLTE, as specified in GSMA PRD IR.92 version 10.0, the dedicated bearer for Conversational Voice must utilize the standardized QCI value of one, "1", and have the associated characteristics as specified in 3GPP TS 23.203, "Policy and charging control architecture" (publicly available at www.3gpp.org) with a maximum packet delay budget (PDB) of 100 milliseconds (ms) and a maximum loss rate of 1%.

ViLTE, as specified in GSMA PRD IR. 94 version 11.0, requires one dedicated bearer resource for voice with QCI 1 as specified in GSMA PRD IR.92 and another dedicated bearer resource for video which may be a Guaranteed Bit Rate, GBR, or a non-GBR bearer. If a GBR bearer is used it must utilize the standardized QCI value of two "2" and have the associated characteristics as specified in 3GPP TS 23.203 with a maximum packet delay budget (PDB) of 150 milliseconds (ms) and a maximum loss rate of 0.1%.

GSMA PRD IR. 92 also specifies that the UE should include a jitter buffer with operation according to the minimum performance requirements as stated in 3GPP TS 26.114 entitled "IP Multimedia Subsystem (IMS); Multimedia Telephony; Media handling and interaction" that adapt to the delay variations of the received packets and minimize the playout delay while retaining a good speech quality.

In 3GPP Release 14, 3GPP approved a Work Item, WI, on enhancements for VoLTE, and ViLTE. In the 3GPP Radio Access Network group meeting 71, RAN #71 meeting, a Study Item, SI, entitled "Study on enhancement of VoLTE" (RP-160563) was approved with the conclusion that the following aspects are to be enhanced for VoLTE/ViLTE: 1) codec mode/rate selection and adaptation; 2) signaling optimization; 3) VoLTE/ViLTE quality and coverage enhancements.

The 3GPP SI concluded with the following outcome with respect to the VoLTE/ViLTE quality and coverage enhancements: Regarding the codec mode/rate selection and adaptation, 3GPP RAN2 group agreed that for the use case of codec rate adaptation during an on-going voice/video call, a RAN-assisted solution is beneficial and feasible. Regarding the VoLTE/ViLTE signaling optimization, RAN2 agreed to use the Mobile Originated (MO) voice cause value in MSG3 for MO video calls, and regarding the VoLTE/ViLTE enhancements to improve quality, candidate solutions, e.g. relaxing the air interface delay budget, for eMTC CE mode A operation (asynchronous UL HARQ transmission, bundle hopping with multi-sub-frame estimation, different repetition levels etc.) are evaluated and proved beneficial for VoLTE/video quality and coverage.

The mouth-to-ear delay is the sum of the delay in the UEs, the radio interface, the backhaul from the eNB to the EPC, and the backbone in the PLMN. Minimum performance requirements on the maximum UE delay for MTSI voice services are stated in 3GPP TS 26.131, "Terminal acoustic characteristics for telephony", publicly available at www.3gpp.org. This delay includes:

Speech frame buffer and codec look-ahead. This is 25 ms and 32 ms for the AMR-WB and EVS codecs used in VoLTE respectively.

UE vendor speech processing delay. This is vendor implementation dependent and the performance objective is below 85 ms and a performance requirement of maximum 125 ms.

Minimum jitter buffer delay. The delay variations used in the tests represents theoretical delay variations that may be expected from a fictive LTE RAN operating in connected mode DRX cycle of 20 ms and 40 ms, and a jitter buffer delay allowance of, respectively, 40 ms and 80 ms is attributed for the two test cases.

As indicated, for VoLTE, the dedicated bearer for Conversational Voice must utilize the standardized QCI value of one, "1", with a maximum packet delay budget (PDB) of 100 milliseconds (ms) and a maximum loss rate of 1%. A delay of 20 ms representing the delay between a PDN GW in EPC and the eNB should be subtracted from a given PDB to derive the packet delay budget that applies to the radio interface. The jitter buffer in the receive side of the UE does not operate based on the absolute delay of the packets but rather on the packet delay variations. The variable component (i.e. packet delay variations) within the PDB of the radio interface is in the mouth-to-ear delay budget attributed to the UE and the constant radio interface delay is attributed to the RAN.

The transport network delay is dependent on the routing of the call and the physical location of the two parties. Example of packet delay for different call scenarios is presented in 3GPP TS 26.114, "IP Multimedia Subsystem (IMS); Multimedia Telephony; Media handling and interaction"] and it is considered that at least 20 ms delay is added by the transport network.

Adding the delay from the UE (assuming the performance objective), the effect of the radio interface, and the fixed transport, the one-way transmission delay will be above 200 ms also with a very short transport delay and RAN delay contribution. The typical delay of a VoLTE call is at the limit were the mouth-to-ear delay is noticeable to the end-user.

SUMMARY

In this disclosure, systems and methods are disclosed for controlling an end-to-end packet trip delay of a packet flow (e.g. an RTP media flow) established between two wireless devices in a network where at least one of the wireless devices is a wireless device and the packet flow is established over a wireless connection between the wireless device and a radio access node.

According to one aspect, a wireless device connected to an access node in a wireless network for controlling an end-to-end packet trip delay for a packet flow established between the wireless device and another device, is provided for measuring the end-to-end packet trip delay between the wireless device and the other device and in response to determining that the measured end-to-end packet trip delay does not meet an end-to-end packet trip delay target for the packet flow, the wireless device executes sending an adjustment indication to the access node for adjusting a packet delay of a wireless connection between the wireless device and the access node over which the packet flow is transported.

In one aspect, the end-to-end packet trip delay measured is greater than the end-to-end packet trip delay target, and the adjustment indication is indicative of a packet delay smaller than a predetermined packet delay configured for the wireless connection.

In another aspect, the end-to-end packet trip delay measured is lower than the end-to-end packet trip delay target, the adjustment indication is indicative of a packet delay greater than a predetermined packet delay configured for the wireless connection.

In another aspect, the wireless device may send an optimization indication to the access node, where the optimization indication indicates if the packet delay adjustment corresponds to at least one of the coverage enhancement or power saving. The optimization indication may indicate to the access node either one of a UE preference or requirement for optimizing the packet delay adjustment.

In one aspect, the end-to-end packet trip delay is a Real-Time Protocol, RTP, packet round trip delay. In another aspect, the end-to-end packet trip delay comprises the wireless connection packet delay and at least one of a transport network packet delay and another wireless connection packet delay associated with a wireless connection for the other device.

In one aspect, the wireless connection packet delay is a Quality of Service Class Identifier, QCI, packet delay configured for a radio bearer associated with the wireless connection and wherein the adjustment indication is indicative of an adjustment for the configured QCI packet delay.

In one aspect, the wireless device comprises a User Equipment, UE, the access node is an eNodeB and the wireless network is a Long-Term Evolution, LTE, network.

According to another aspect, a wireless device connected to an access node over a wireless connection transporting a packet flow established between the wireless device and another device, is provided for determining based on for example measurement of end-to-end packet trip delay not meeting an end-to-end packet trip delay target, that a packet delay budget for the wireless connection is to be adjusted at the access node and sending an adjustment information to the access node comprising an optimization indication and a corresponding adjustment value to apply for changing the packet delay budget.

In one aspect, the optimization indication indicates optimization for power saving operation and the corresponding adjustment value for changing the packet delay budget corresponds to an adjustment amount to be applied on current length of a Discontinuous Reception, DRX, cycle of the wireless connection. In another aspect, the optimization indication indicates optimization for coverage enhancement and the corresponding adjustment value for changing the packet delay budget corresponds to an adjustment amount to be applied on current number of repetitions in Transmission Time Interval, TTI, bundling of the wireless connection.

According to another aspect, an access node connected to a wireless device in a wireless network for controlling an end-to-end packet trip delay of a packet flow established between the wireless device and another device, is provided, for receiving an adjustment indication from the wireless device for adjusting a packet delay of a wireless connection between the wireless device and the access node over which the packet flow is transported, and adjusting the packet delay of the wireless connection based on information included in the adjustment indication. The information included in the adjustment indication may comprise an adjustment value to apply for changing the packet delay of the wireless connection. The adjustment value may correspond to an adjustment amount to be applied on current length of a Discontinuous Reception, DRX, cycle of the wireless connection when the optimization is for power saving operation. The adjustment value may also correspond to an adjustment amount to be applied on current number of repetitions in Transmission Time Interval, TTI, bundling of the wireless connection when the optimization is for enhancing the coverage.

In one aspect, adjusting the packet delay of a wireless connection comprises adjusting the wireless connection packet delay so that the end-to-end packet trip delay meets an end-to-end packet trip delay target for the packet flow.

In one aspect, the access node further executes the step of determining a quality of the wireless connection.

In accordance with another aspect, a wireless device is provided that comprises a at least one transceiver; and a circuitry operable to perform any of the embodiments described herein.

In accordance with another aspect, an access node is provided that comprises a at least one transceiver; and a circuitry operable to perform any of the embodiments described herein.

Note that while the description provided herein focuses on LTE, the present disclosure is not limited thereto. The concepts disclosed herein are applicable to any type of wireless communication network (e.g., any type of cellular communications network) in which a wireless connection packet delay treatment can be adjusted, if desired. Such wireless communication networks include but not limited to LTE, 5G and Wireless Fidelity, WiFi™ networks.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
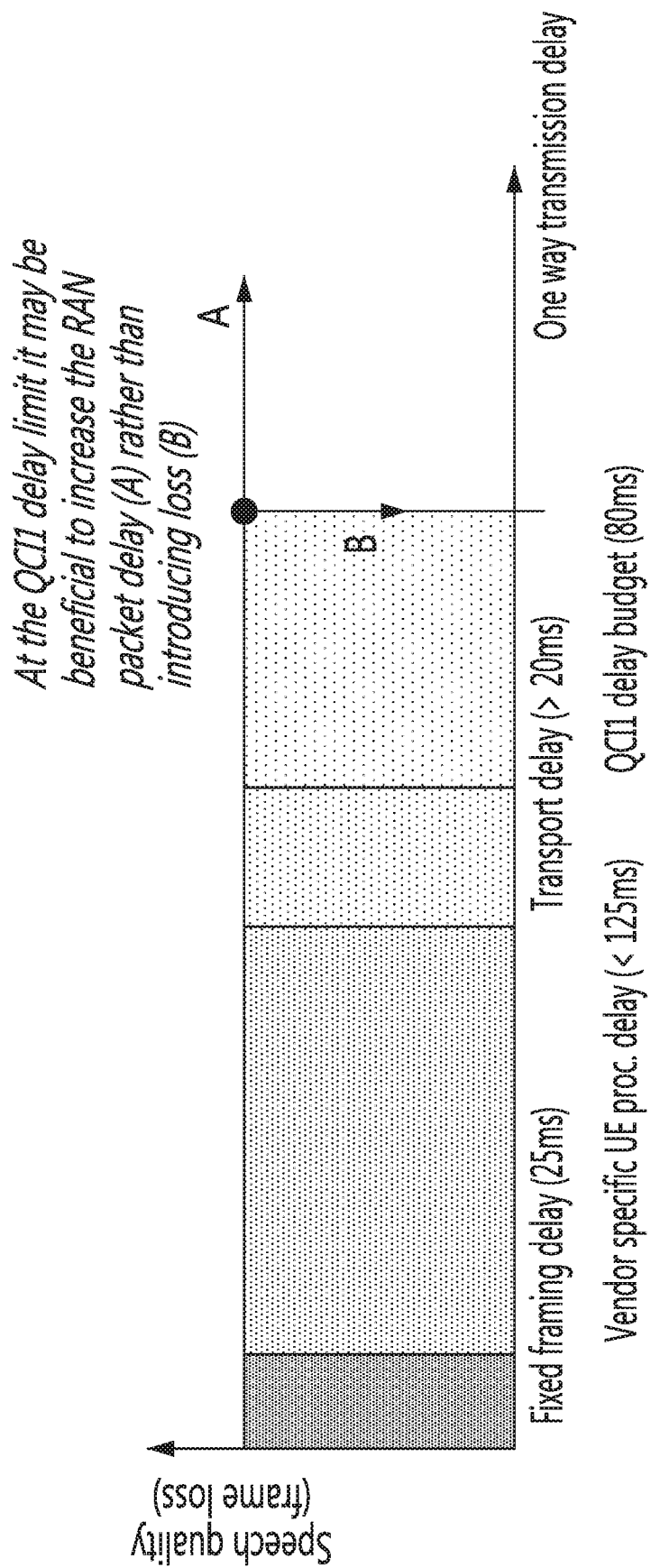
FIG. 1 illustrates an example for radio bearers with a Quality of Service Class Identifier (QCI) value of 1.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device", WD, 10 is any type of device that has access to (i.e., is served by) a cellular communications network by wirelessly transmitting and/or receiving signals to a radio access node (s). The WD 10 refers to a device capable, configured, arranged and/or operable to communicate wirelessly with network nodes and/or other wireless devices. Communicating wirelessly may involve transmitting and/or receiving wireless signals using electromagnetic signals, radio waves, infrared signals, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, user equipment (UE), smart phone, mobile phone, cell phone, voice over IP (VoIP) phone, wireless local loop phone, desktop computer, personal data assistant (PDA), wireless cameras, gaming terminal devices, music storage, playback appliances, wearable terminal devices, wireless endpoints, mobile stations, tablets, laptops, laptop-embedded equipment (LEE), laptop-mounted equipment (LME), USB dongles, smart devices, wireless customer-premise equipment (CPE) and vehicle-mounted wireless terminal devices. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard (cellular IoT, CIoT), Wireless Fidelity, WiFi™ standard, Bluetooth, or other. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. A wired device is similar to a wireless device except it communicates with network nodes over wired interface instead of radio technology.

Network Node: As used herein, a "network node" is any node that is either part of the radio access network or the CN of a cellular communications network/system.

Jitter: is defined as a variation in the delay of received packets. The sending side transmits packets in a continuous stream and spaces them evenly apart. Because of network congestion, improper queuing, or configuration errors, the delay between packets can vary instead of remaining constant.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

The present disclosure is directed to mechanisms for controlling an end-to-end packet trip delay of a packet flow (e.g. an RTP media flow) established between two devices (e.g. two UEs) in a network where at least one of the devices is a wireless device and the packet flow is established over a wireless connection between the wireless device and a radio access node. The end-to-end packet trip delay should be kept to a minimum to improve the conversational quality.

When a wireless device (e.g. a UE) is in bad radio coverage, there may be many HARQ retransmissions which increase jitter, hence, the packets with retransmissions are more likely to be discarded by a receiving device (e.g. a destination UE), thereby impacting the end-to-end packet trip delay as well as possibly the user experience. If the receiving UE on the other end of the voice call is in good radio coverage, yet it observes high packet discarding rate at its jitter buffer, there is currently no mechanism to adjust the UE's wireless packet transmission conditions e.g. schedule the packets more stringently, e.g. with a shorter Discontinuous Reception (DRX) cycle so as to relax the delivery of packets to the UE in bad coverage but still meet a desired end-to-end packet round-trip delay target or requirement for the packet flow.

A VoLTE client may derive the round-trip delay of the RTP packets based on the RTCP reports. Since the contribution from the speech processing delay and the jitter buffer delay [R2-167086] to the transmission delay is not visible at the RTP level, the RTP round-trip delay does not exactly match the mouth-to-ear delay but it will give an indication of the transmission delay as perceived by the end-user.

As discussed in [R2-167086] publicly available at www.3gpp.org, depending on the physical location of the two parties the end-to-end delay may be in excess of the 200 ms for which the delay starts to significantly impact the quality of experience (QoE) of a voice call. Thus, in a situation with a long delay it may be beneficial for the QoE if the air interface delay, if possible, is reduced compared to the established QCI packet delay budget. One scenario with how air interface delay may be reduced is observed in [R2-167076]. A DRX cycle setting of 40 ms causes a longer air interface delay and end-to-end delay compared to a shorter DRX cycle or no DRX.

A conclusion from [R2-167086] is that in a situation where the Radio Access Network (RAN) has either of the two options (A) of extending the packet delay and keeping the packet loss at a low level or (B) of keeping the delay and delay variations within a pre-defined level and introducing extra packet loss, it may be preferable to allow for an increased delay and keeping the loss rate low.

FIG. 1 shows an example for radio bearers with a Quality of Service Class Identifier (QCI) value of 1, where, to meet a desired target end-to-end packet trip delay (shown as the one way transmission delay in this example) and therefore improve the speech quality, it may be beneficial to increase the packet delay configured for the QCI1 bearers (A) rather than introducing loss (B).

There may however be situations where the end-to-end packet trip delay does not meet the service requirements and in such a situation it may be beneficial for the overall system performance if the packet delay budget for the wireless connection(s) is relaxed.

Figure 2:
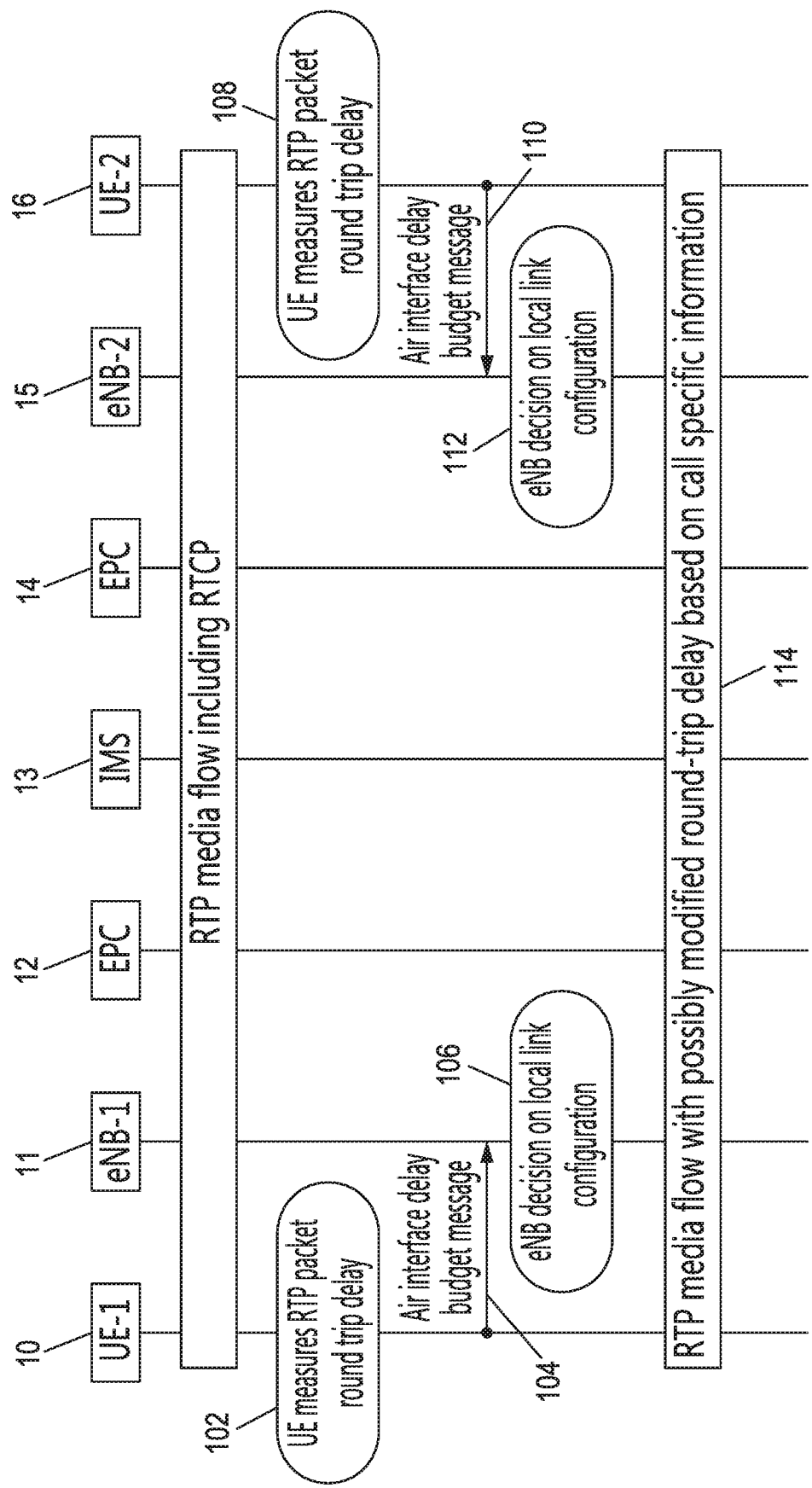
FIG. 2 illustrates an example of an RTP media flow between two UEs and interaction with their respective to adjust their RAN packet delay, according to an embodiment.

FIG. 2 describes an example of an RTP media flow between two UEs 10, 16 and in which the UEs 10, 16 and their respective eNBs 11, 15 may interact to adjust their RAN packet delay (e.g. a QCI packet delay) based on conditions or a quality of their respective wireless connection so that an end-to-end packet trip delay target for the RTP flow can be more easily met.

Once an RTP flow (including RTCP) has been established, the UEs 10, 16 and eNBs 11, 15 perform the following steps:

Steps 102, 108: UE-1 and UE-2 measure an RTP packet round-trip delay, using for example, RTCP reports.

Steps 104, 110: If the measured RTP packet round-trip delay is above a threshold or target, either or both of UE-1 and UE-2 may send a message (e.g. an air interface delay message) to their respective eNB to convey an adjustment indication indicating that the currently established packet delay budget for its local wireless connection should be modified if possible.

Steps 106, 112: if an air interface delay message is received, the eNB-1 and eNB-2 evaluate (a quality of) the local link conditions and/or user policies to decide if the packet delay treatment on the local wireless connection may be modified according to the respective message from UE-1 and UE-2.

Step 114: the eNB-1 and eNB-2 adjust the packet delay on the local wireless connect based on the air interface delay message received, the round trip delay of the RTP media flow may be adjusted based on the information provided by the UEs.

In some embodiments, the scheme above does not require that the UEs 10, 16 be aware of the channel conditions for the remote UE, but the information exchange from the respective UE 10, 16 to the eNB 11, 15 is triggered based on the measured RTP round-trip delay.

In one example, the adjustment information is a packet delay budget recommendation provided in the air interface delay message from the UE 10, 16 to the eNB 11, 15 in Steps 104, 110 2 above is proposed to be provided via a Medium Access Control (MAC) CE as follows:

| Logical Channel Identity (4-bit) | UL/DL (1-bit) | Table Index (3-bit) |
| --- | --- | --- |

The table index shown above is proposed as a scaling factor to be applied to the packet delay budget of the established QCI, as outlined in Table 1 below illustrates QCI packet delay budget scaling factor. The reference for the scaling factor may be known to the UE 10, 16 from
- the standardized QCI 1 characteristics as specified in 3GPP TR 23.203, "Policy and charging control architecture", Table 6.1.7,
- explicitly configured by the application layer or
- otherwise made known or signaled to the UE 10, 16.

TABLE 1

Example of tabulated QCI packet delay budget scaling factor

| Table index | QCI packet delay budget scaling factor |
| --- | --- |
| 0 | 0.25 |
| 1 | 0.5 |
| 2 | 0.75 |
| 3 | 1.0 |
| 4 | 1.25 |
| 5 | 1.5 |
| 6 | 1.75 |
| 7 | Reserved |

As an example, if the UE 10, 16 measures a delay of 40 ms in excess of the service requirements of the round-trip delay target and the packet delay budget of the established QCI is 80 ms (QCI1), it may signal the value 0.5 to the eNB 11, 15. The respective eNB 11, 15 may then use this information to decide on possibly modifying the packet treatment accordingly. Similarly, if the UE 10, 16 measures a delay of 40 ms below the service requirements of the round-trip delay and the packet delay budget of the established QCI is 80 ms (QCI1), it may signal the value 1.5 to the eNB 11, 15. Other possibilities exist for the type of message and the type of adjustment indication used.

In another example, the adjustment information is proposed to be provided via an RRC message as follows:

```
UuDelayBudgetReport ::=  SEQUENCE {
       ueReportCause         ENUMERATED {coverageEnhancement,
lowPowerConsumption},
       delayBudgetAdjustment  ENUMERATED {
                              -160, -80, -60, -40, -20, 0, 8, 16, 20,
24, 40, 48, 60, 72, 80, 96, 120, 144, 160}
}
```

An optimization indication may be also be provided to the access node. In some embodiments, the optimization indication may be comprised within the adjustment information. In other embodiments, it may be provided in a separate message. The optimization indication provides the eNB with an indication from the UE of which type of optimization is preferred by the UE. For example, if the UE prefers that the eNB performs a first optimization the UE indicates a first value, while if the UE prefers that the eNB performs a second optimization the UE indicates a second value. Which optimization the UE prefers may be determined based on the UE measurements of the end-to-end delay.

In one embodiment, the optimization indication may be via the field ueReportCause. I In the above example the field can take two values; coverageEnhancement and lowPowerConsumption. The value coverageEnhancement indicates that the UE prefers that the delay budget adjustment primarily is used for enhancing the coverage, e.g. by increasing or decreasing the number of repetitions in Transmission Time Interval, TTI, bundling or Coverage Enhancement mode, or the number of HARQ transmissions. It would be possible that further details are provided by the UE as to which particular adjustment the UE prefers, e.g. whether it prefers a change in the number of repetitions in TTI bundling (rather than some other adjustment).

The value lowPowerConsumption indicates that the UE prefers that the delay budget increase or decrease primarily is used for the optimization of the power saving operation of the UE, e.g. the DRX setting.

According to some embodiments, the optimization indication is a UE requirement (or necessary condition) from the eNB. According to alternate embodiments, the optimization indication is a preference, or suggestion, or indication of the UE, rather than a necessary condition. Accordingly, upon receipt of the optimization indication, the eNB may take other actions if the preferred action is not deemed suitable by the eNB. For example, the eNB may not support to adjust the number of repetitions in TTI bundling, and the eNB may then ignore the suggestion/preference of the UE, or the eNB may take alternative actions. On the other hand, it may be so that the indication is a command which would force the eNB to take action indicated by the UE, however this may not be suitable in case the eNB cannot comply with the UEs request.

In the above it has been used as an example two types of ways of how the UE prefers the eNB to adjust the delay budget. It should be appreciated that also other types can be used.

In the above it has been used as an example that the UE indicates a single particular preference of what the eNB should optimize for when adjusting the delay budget.

Another possibility is that the UE indicates an indication of priority between the different ways of how the UE prefers the eNB to adjust the delay budget. For example the UE may think a first way of optimization should be prioritized by the eNB and the UE may then indicate that this should be prioritized, for example by a numerical value. For example, if there are three ways to optimize when adjusting the delay budget, the UE can indicate that a first way has highest priority, a third one has second highest priority and the second one has a second way has a third priority.

The reported value of the adjustment of the packet delay budget in this example is provided in the field named delayBudgetAdjustment and is indicated as a number to be added (or subtracted) from the established packet delay budget of the established QCI. In another example the reported value of the adjustment of the packet delay budget in the field named delayBudgetAdjustment is indicated as a new proposed value for the packet delay budget for the air interface and overriding the current values for the QCI values of the established bearers.

In one embodiment, the optimization indication may be omitted if the UE does not have a preference in which way the adjustment is optimized.

In one embodiment, the UE 10 may omit the indication if the UE 10 has a certain preference. For example, if the UE prefers that the adjustment is primarily used for enhancing the coverage the UE 10 may omit the indication. If this behavior is known to the network the network can know that if the UE 10 does not provide the indication it means that the UE's preference is that the adjustment is primarily used for enhancing the coverage. This may allow signaling to be reduced since the UE 10 may omit the field in some cases. In one embodiment, the UE 10 may omit the indication if the preference is the same as in most recent report. For example, if the UE 10 transmits a report wherein it is indicated that the UE prefers that adjustment is primarily used for enhancing the coverage, the next time the UE transmits a report the UE 10 may omit this indication if the preference also then is that the adjustment is primarily used for enhancing the coverage.

Figure 3:
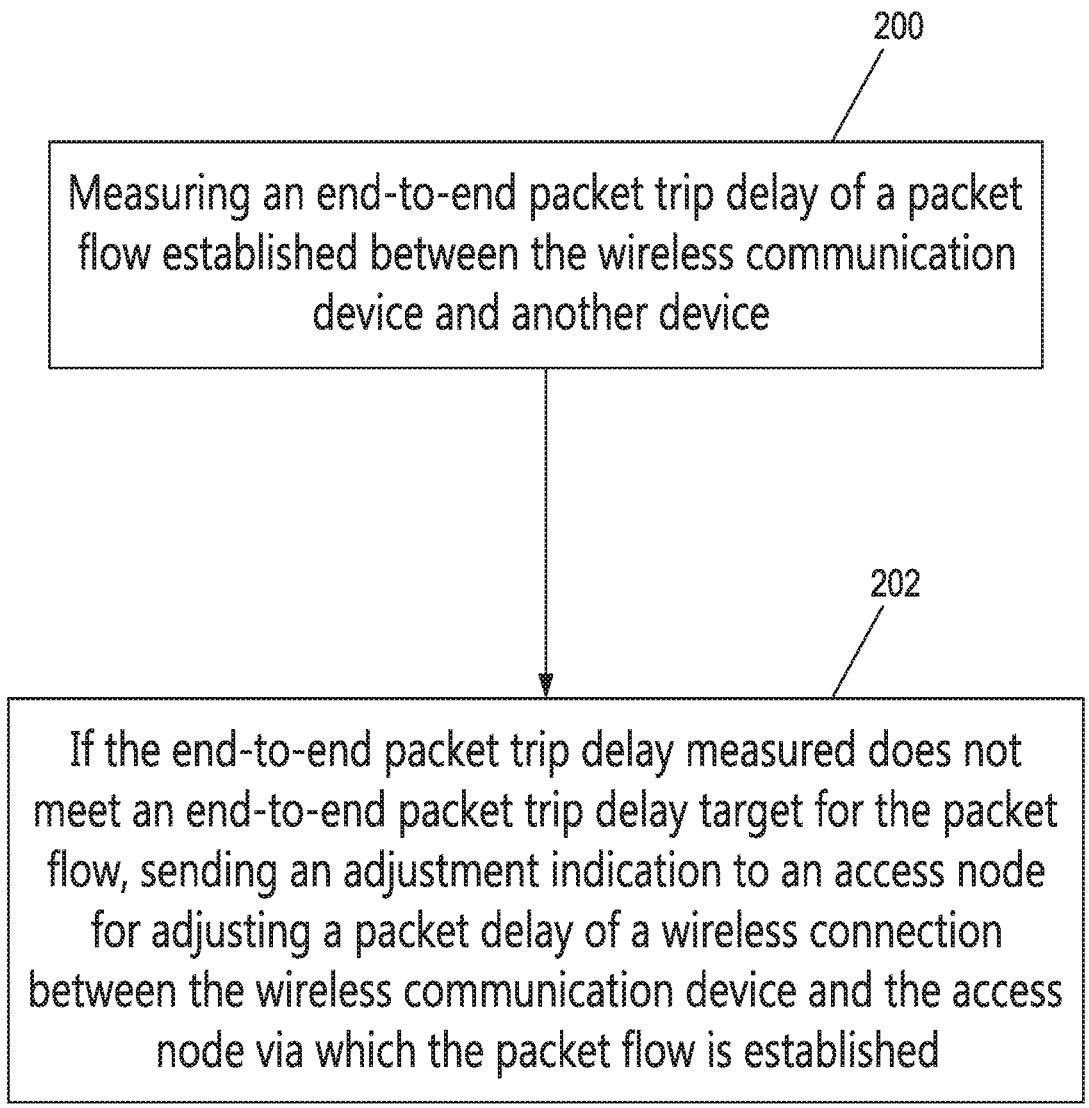
FIG. 3 illustrates a method for wireless device (e.g. UE) for controlling an end-to-end packet trip delay, according to an embodiment.

FIG. 3 shows a method for wireless device (e.g. UE 10, 16) for controlling an end-to-end packet trip delay (e.g. an RTP round trip packet delay) of a packet flow (e.g. an RTP media flow) established between the wireless communication and another device. At step 200, the method includes measuring an end-to-end packet trip delay between the wireless device and the other device. At step 202, the method further includes if the end-to-end packet trip delay measured does not meet an end-to-end packet trip delay target for the packet flow, sending an adjustment indication or information to the access node for adjusting a packet delay of a wireless connection between the wireless device and the access node via which the packet flow is established.

Figure 3A:
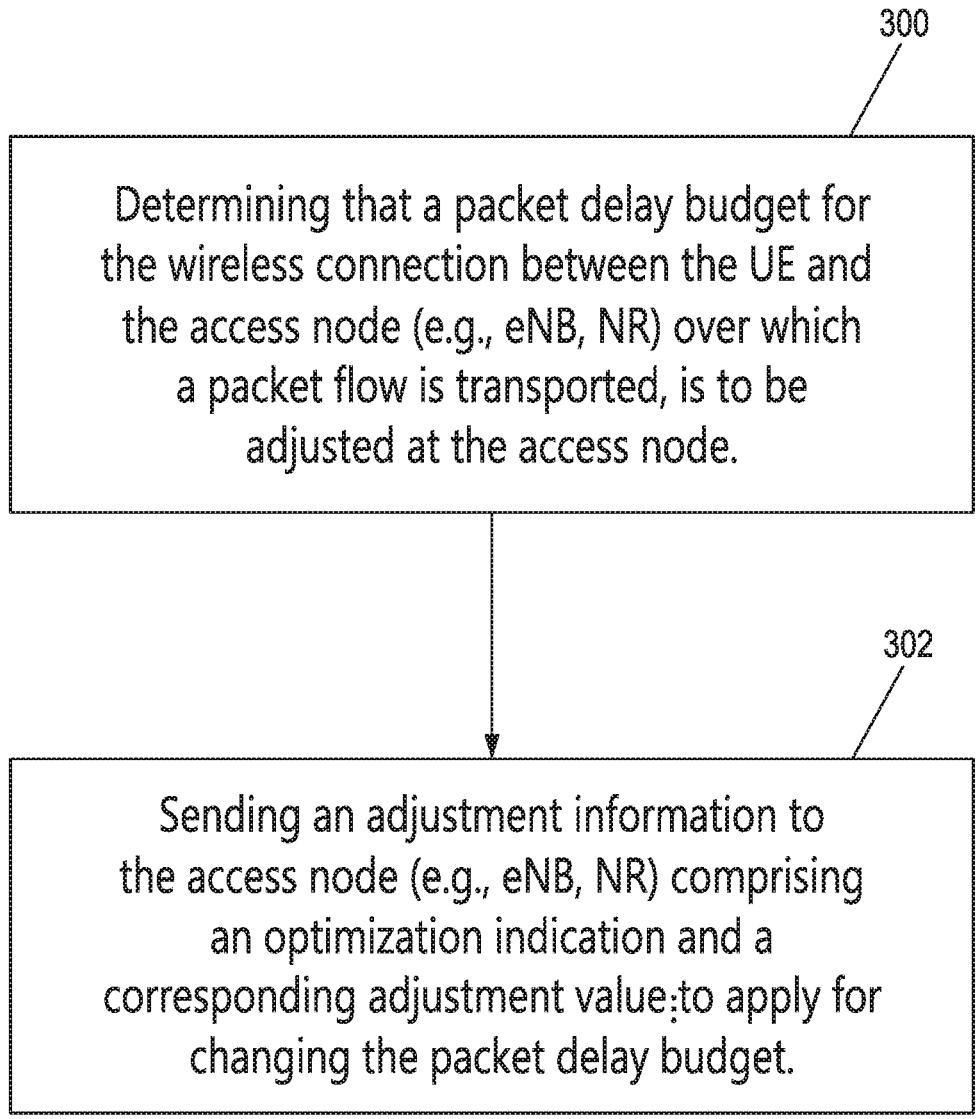
FIG. 3A illustrates a method for a wireless device (e.g., UE) for controlling an end-to-end packet trip delay, according to another embodiment.

In another example, illustrated in FIG. 3A for a method executed at the wireless device (referred herein as UE) connected to the access node (e.g., eNB or Next Generation Radio, NR) over a wireless connection, such as an LTE air interface Uu interface, and a packet flow such as an RTP VoLTE flow is transported over the wireless connection. QoS parameters are configured for the wireless connection. In LTE, the QoS parameters are indicated by a QCI value. For VoIP, the wireless connection has a QCI of 1 as specified in GSMA PRD IR.92. One of the associated parameters of the QCI is the packet delay budget as specified in 3GPP TS 23.203.

At step 300, the method includes the step of determining by the UE that the packet delay budget assigned for the wireless connection is to be adjusted at the access node (eNB). The UE may make such determination based on measurement of the end-to-end packet trip delay and determining that the measured end-to-end packet trip delay does not meet an end-to-end packet trip delay target for the packet flow. The UE makes such determination to optimize the power consumption at the wireless device or enhance the coverage.

At step 302, the UE executes the step of sending to the access node an adjustment information message which may be an RRC message such UeDelayBudgetReport as shown below:

```
UuDelayBudgetReport ::= SEQUENCE {
    ueReportCause        ENUMERATED {coverageEnhancement,
lowPowerConsumption},
    delayBudgetAdjustment ENUMERATED {
                        -160, -80, -60, -40, -20, 0, 8, 16, 20,
24, 40, 48, 60, 72, 80, 96, 120, 144, 160}
}
```

The adjustment information comprises an optimization indication and a corresponding adjustment value to apply for changing the packet delay budget of the wireless connection.

Optimization indication: The optimization indication provided by the UE to the eNB is an indication of which type of optimization is preferred by the UE. For example, if the UE prefers that the eNB performs a first optimization the UE indicates a first value, while if the UE prefers that the eNB performs a second or another optimization the UE indicates a second value. Which optimization the UE prefers may be determined based on the UE measurements of the end-to-end delay. One or more type of optimization may be included in the adjustment information.

A first optimization may correspond to power saving operation and a second optimization may correspond to enhancing the coverage. Embodiments are described with two types of optimizations but it is not limited thereto. Similar scheme as described herein may be applied to any other optimization type for which a packet delay budget adjustment is required. In one embodiment, the optimization indication may be via the field ueReportCause. The field can take the following values for power consumption and coverage enhancement: lowPowerConsumption and coverageEnhancement.

Adjustment value: the UE includes an adjustment value which in accordance with the type of optimization corresponds to the amount by which the UE prefers that the delay budget increases or decreases in accordance with the type of optimization. If the first optimization indicates power saving operation or has a value indicating lowpowerConsumption, the adjustment value represents the amount by which the UE prefers that the delay budget increases or decreases for the optimization of the power saving operation of the UE, e.g. the length of DRX cycle. The reported value of the adjustment of the packet delay budget may be provided in the field named delayBudgetAdjustment and is indicated as a number to be added (or subtracted) from the established packet delay budget of the established QCI. In another example, the reported value of the adjustment of the packet delay budget in the field named delayBudgetAdjustment is indicated as a new proposed value for the packet delay budget for the air interface and overriding the current values for the QCI values of the established bearers.

If the second optimization indicates coverage enhancement or has a value indicating coverageEnhancement, the adjustment value represents the amount by which the UE prefers that the delay budget increases or decreases for enhancing the coverage for the UE, e.g. by increasing or decreasing the number of repetitions in TTI bundling or Coverage Enhancement mode, or the number of HARQ transmissions. It would be possible that further details are provided by the UE as to which particular adjustment the UE prefers, e.g. whether it prefers a change in the number of repetitions in TTI bundling (rather than some other adjustment).

According to some embodiments, the optimization indication is a UE requirement (or necessary condition) from the eNB. According to alternate embodiments, the optimization indication is a preference, or suggestion, or indication of the UE, rather than a necessary condition.

In the above embodiments, it has been used as an example that the UE indicates a single particular preference of what the eNB should optimize for when adjusting the delay budget. Another possibility is that the UE indicates an indication of priority between the different ways of how the UE prefers the eNB to adjust the delay budget. For example, the UE may determine a first way of optimization should be prioritized by the eNB and the UE may then indicate that this should be prioritized, for example by a numerical value. For example, if there are three ways to optimize when adjusting the delay budget, the UE can indicate that a first way has highest priority, a third one has second highest priority and the second one has a second way has a third priority.

Figure 4:
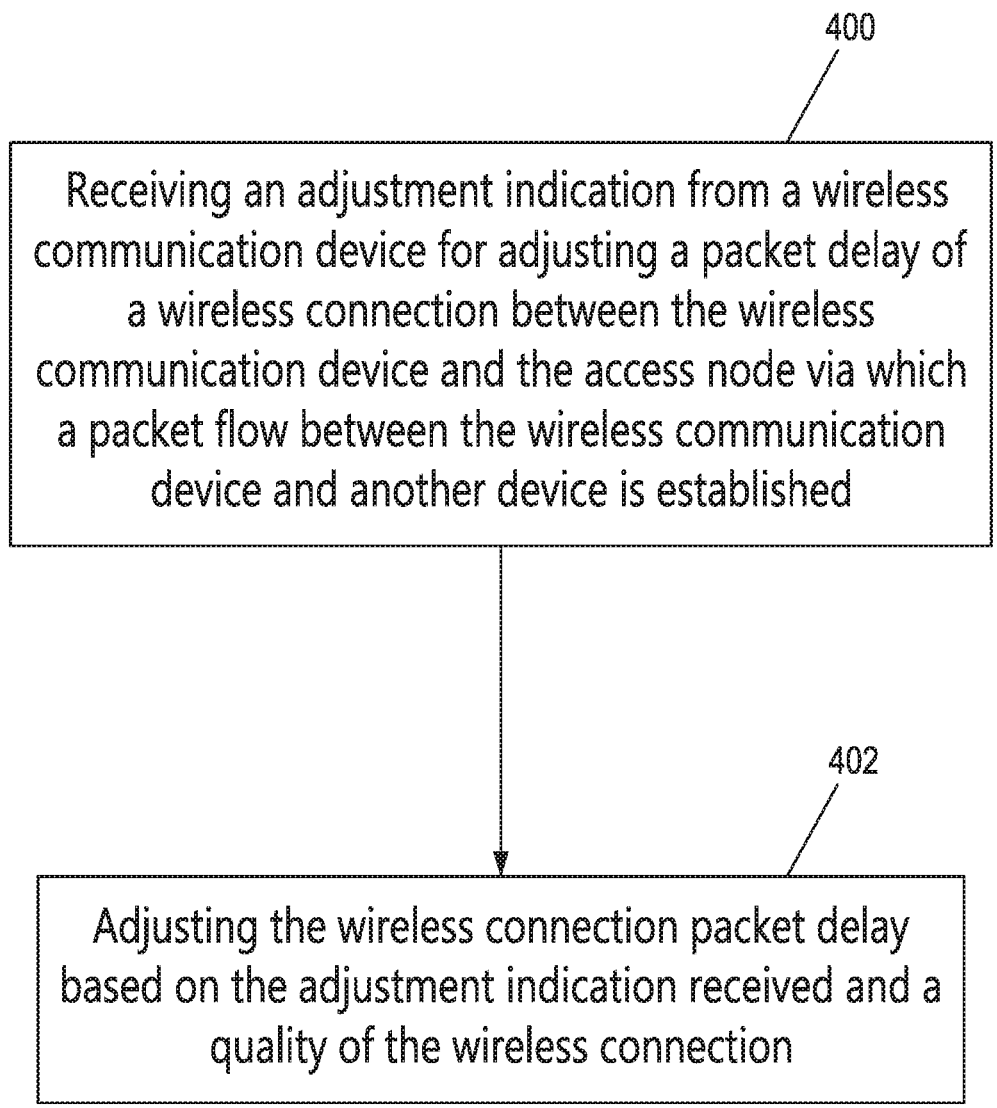
FIG. 4 illustrates a method for an access node (e.g. eNB) connected to a wireless device (e.g. UE) for controlling an end-to-end packet trip delay, according to an embodiment.

FIG. 4 shows a method for an access node (e.g. eNB 11, 15) connected to a wireless device (e.g. UE 10, 16) in a wireless network for controlling an end-to-end packet trip delay of a packet flow established between the wireless communication and another device. The method includes at step 400 receiving an adjustment indication/information from the wireless device for adjusting a packet delay of a wireless connection between the wireless device and the access node via which the packet flow is established.

In another example, the adjustment information is received via an RRC message UuDelayBudgetReport as follows:

```
UuDelayBudgetReport ::= SEQUENCE {
    ueReportCause        ENUMERATED {coverageEnhancement,
lowPowerConsumption},
    delayBudgetAdjustment ENUMERATED {
                        -160, -80, -60, -40, -20, 0, 8, 16, 20,
24, 40, 48, 60, 72, 80, 96, 120, 144, 160}
}
```

An optimization indication may also be received by the eNB. In some embodiments, the optimization indication may be comprised within the adjustment information. In other embodiments, it may be provided in a separate message. The optimization indication provides the eNB with an indication from the UE of which type of optimization is preferred by the UE. For example, if the UE prefers that the eNB performs a first optimization the UE indicates a first value, while if the UE prefers that the eNB performs a second optimization, the UE indicates a second value.

Accordingly, upon receipt of the optimization indication, the eNB may take other actions if the preferred action is not deemed suitable by the eNB. For example, the eNB may not support to adjust the number of repetitions in TTI bundling, and the eNB may then ignore the suggestion/preference of the UE, or the eNB may take alternative actions. On the other hand, it may be so that the indication is a command which would force the eNB to take action indicated by the UE, however this may not be suitable in case the eNB cannot comply with the UEs request.

In the above it has been used as an example two types of ways of how the eNB is informed by the UE to adjust the delay budget. It should be appreciated that also other types can be used.

In one embodiment, the eNB receives information about a single particular optimization preference regarding what the eNB should optimize for when adjusting the delay budget. In another embodiment, the eNB receives an indication of priority between the different ways of how the UE prefers the eNB to adjust the delay budget.

At step 402, the method further includes adjusting the wireless connection packet delay based on the received adjustment indication which may or may not include an optimization indication and a quality of the wireless connection.

Figure 5:
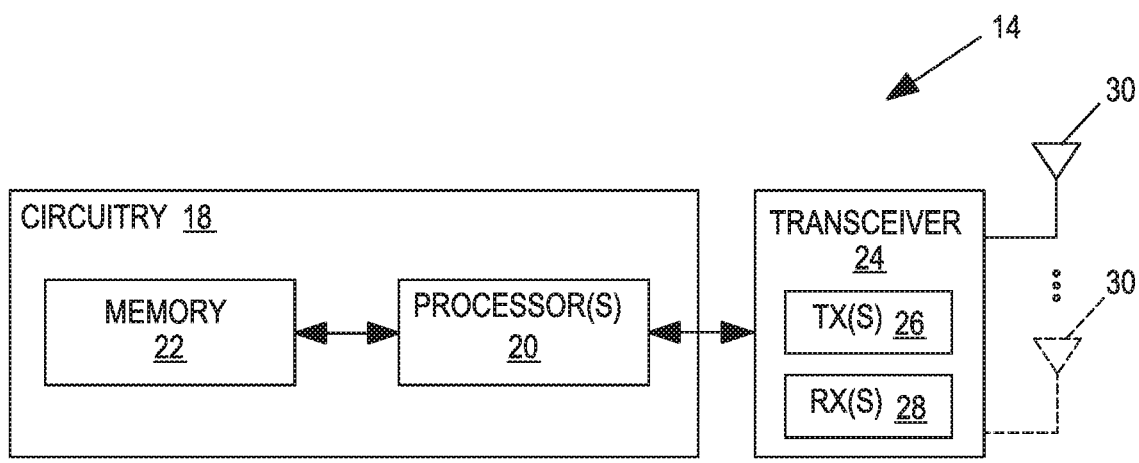
FIG. 5 illustrates a schematic block diagram of the wireless device according to some embodiments.

FIG. 5 is a schematic block diagram of the wireless device 10 according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 10 also includes one or more transceivers 24 each including one or more transmitter 26 and one or more receivers 28 coupled to one or more antennas 30. In some embodiments, the functionality of the wireless device 10 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 10 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 6:
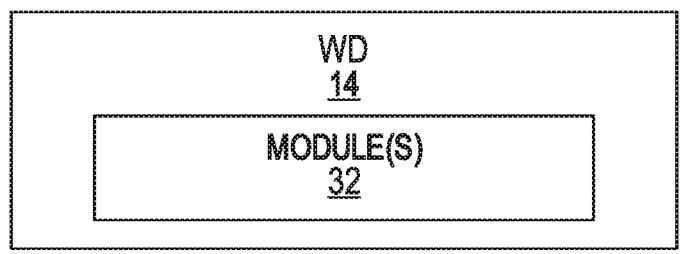
FIG. 6 illustrates a schematic block diagram of the wireless device according to some other embodiments.

FIG. 6 is a schematic block diagram of the wireless device 10 according to some other embodiments of the present disclosure. The wireless device 10 includes one or more modules 32, each of which is implemented in software. The module(s) 32 provide the functionality of the wireless device 14 (e.g., UE) described herein.

Figure 7:
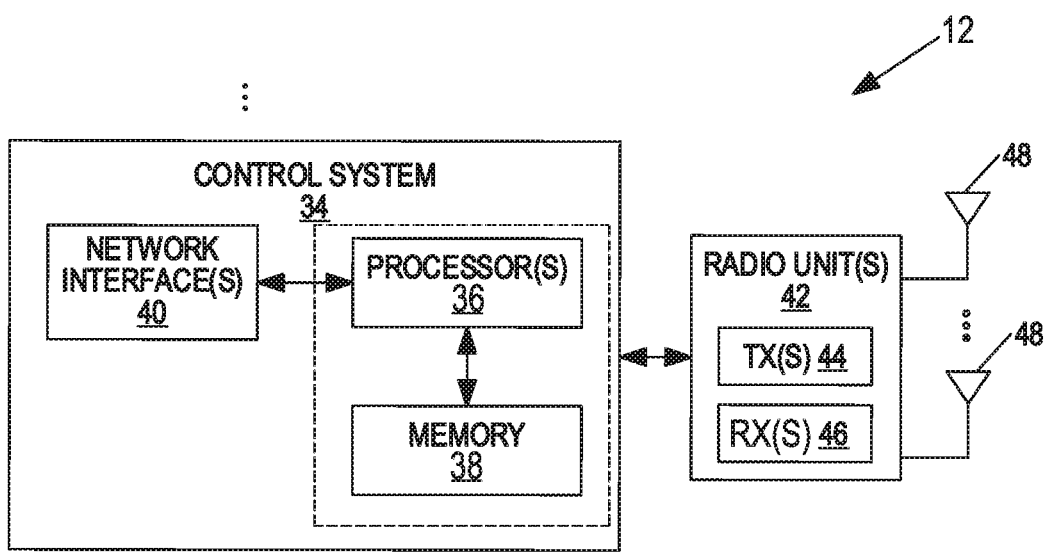
FIG. 7 illustrates a schematic block diagram of the radio access node according to some embodiments.

FIG. 7 is a schematic block diagram of the radio access node 11 according to some embodiments of the present disclosure. Other types of network nodes may have similar architectures (particularly with respect to including processor(s), memory, and a network interface). As illustrated, the radio access node 11 includes a control system 34 that includes circuitry comprising one or more processors 36 (e.g., CPUs, ASICs, FPGAs, and/or the like) and memory 38. The controls system 34 also includes a network interface 40. The radio access node 11 also includes one or more radio units 42 that each includes one or more transmitters 44 and one or more receivers 46 coupled to one or more antennas 48. In some embodiments, the functionality of the radio access node 11 described above may be fully or partially implemented in software that is, e.g., stored in the memory 38 and executed by the processor(s) 36.

Figure 8:
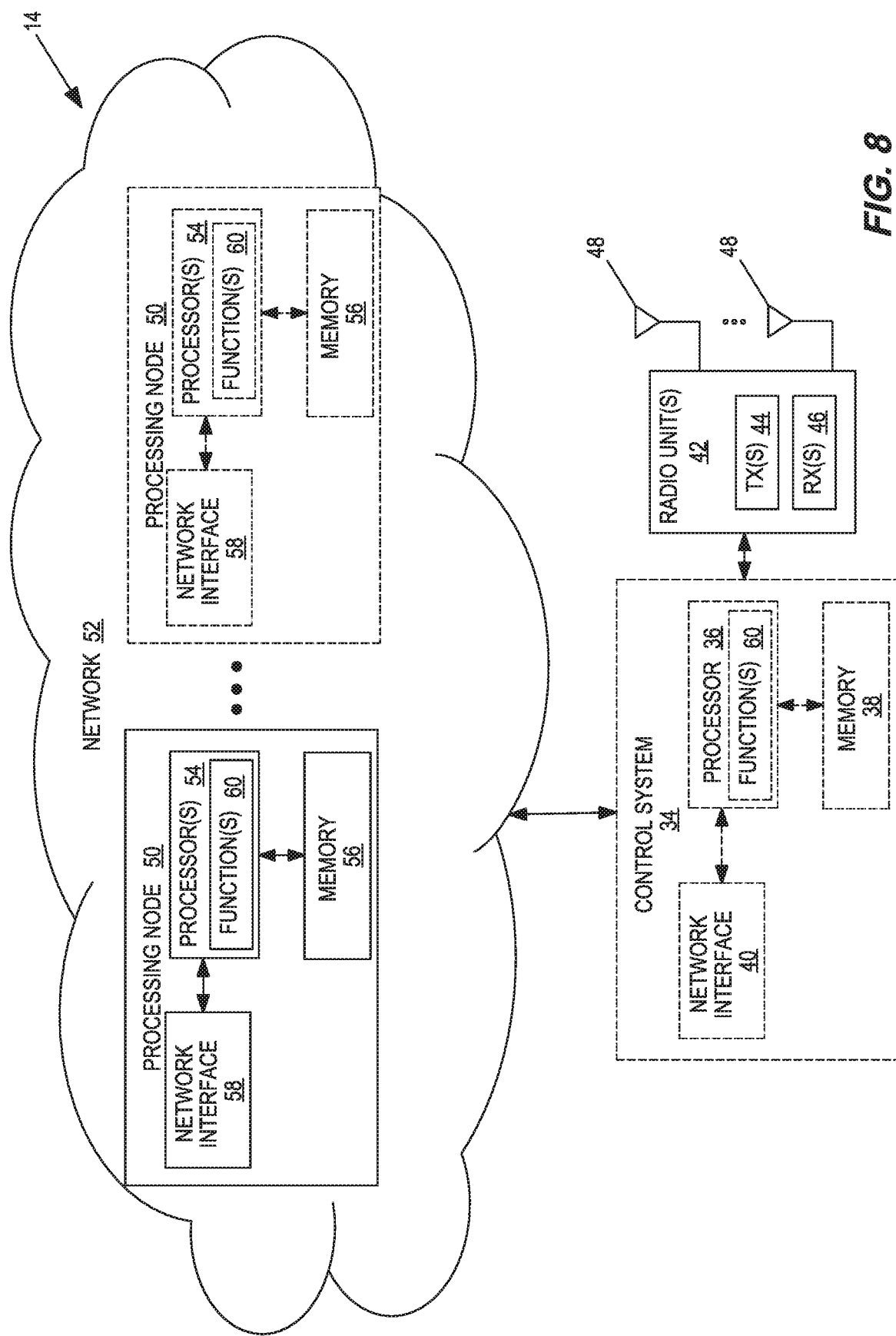
FIG. 8 is a schematic block diagram that illustrates a virtualized embodiment of the radio access node according to some embodiments.

FIG. 8 is a schematic block diagram that illustrates a virtualized embodiment of the radio access node 11 according to some embodiments of the present disclosure. Other types of network nodes may have similar architectures (particularly with respect to including processor(s), memory, and a network interface).

As used herein, a "virtualized" radio access node 11 is a radio access node 11 in which at least a portion of the functionality of the radio access node 11 is implemented as a virtual component (e.g., via a virtual machine(s) executing on a physical processing node(s) in a network(s)). As illustrated, the radio access node 11 optionally includes the control system 34, as described with respect to FIG. 7. The radio access node 11 also includes the one or more radio units 42 that each includes the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 11 described herein are implemented at the one or more processing nodes 50 or distributed across the control system 34 (if present) and the one or more processing nodes 50 in any desired manner. In some particular embodiments, some or all of the functions 60 of the radio access node 11 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicate directly with the processing node(s) 50 via an appropriate network interface(s).

In some embodiments, a computer program including instructions which, when executed by at least one processor, causes the at least one processor to carry out the functionality of the radio access node 11 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 9:
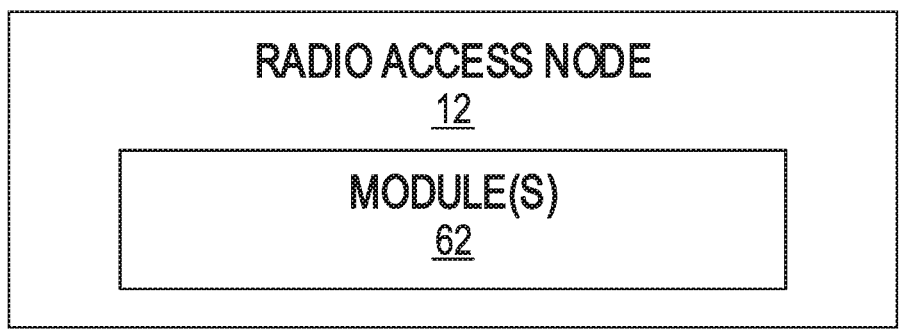
FIG. 9 is a schematic block diagram of the radio access node according to some other embodiments.

FIG. 9 is a schematic block diagram of the radio access node 11 according to some other embodiments of the present disclosure. The radio access node 11 includes one or more modules 62, each of which is implemented in software. The module(s) 62 provide the functionality of the radio access node 11 described herein.

In the present disclosure, reference is made to measuring an end-to-end packet trip delay and the associated end-to-end packet trip delay measured. According to certain embodiments, measuring an end-to-end packet trip delay and the associated end-to-end packet trip delay measured may be understood as obtaining (via any means know to a person skilled in the art, not limited to direct measurement) an end-to-end packet trip delay and the associated end-toend packet trip delay obtained (via any means know to a person skilled in the art, not limited to direct measurement), respectively.

While not being limited thereto, some other example embodiments of the present disclosure are provided below.

Embodiment 1. A method for a wireless device connected to an access node in a wireless network for controlling an end-to-end packet trip delay of a packet flow established between the wireless communication and another device, the method comprising:
measuring an end-to-end packet trip delay between the wireless device and the other device; and
if the end-to-end packet trip delay measured does not meet an end-to-end packet trip delay target for the packet flow, sending an adjustment indication to the access node for adjusting a packet delay of a wireless connection between the wireless device and the access node via which the packet flow is established.

Embodiment 2. The method of embodiment 1 wherein if the end-to-end packet trip delay measured is greater than the end-to-end packet trip delay target, the adjustment indication is indicative of a packet delay smaller than a predetermined packet delay configured for the wireless connection.

Embodiment 3. The method of embodiment 1 or 2 wherein if the end-to-end packet trip delay measured is lower than the end-to-end packet trip delay target, the adjustment indication is indicative of a packet delay greater than a predetermined packet delay configured for the wireless connection.

Embodiment 4. The method of any one of embodiments 1-3 further comprising determining that the end-to-end packet trip delay measured does not meet the end-to-end packet trip delay target.

Embodiment 5. The method of any one of embodiments 1-4 further comprising sending an optimization indication to the access node, where the optimization indication indicates if the packet delay adjustment is for either one or both of the coverage enhancement or power saving Embodiment 6. The method of any one of embodiments 1-4 further comprising sending an optimization indication to the access node indicating either one of a UE preference or requirement of how the packet delay adjustment should be optimized.

Embodiment 7. The method of any one of embodiments 1-4 wherein the end-to-end packet trip delay is a Real-Time Protocol (RTP) packet round trip delay.

Embodiment 8. The method of any one of embodiments 1-7 wherein the packet flow is an RTP media flow.

Embodiment 9. The method of any one of embodiments 1-8 wherein the end-to-end packet trip delay comprises the wireless connection packet delay and at least one of a transport network packet delay and another wireless connection packet delay associated with a wireless connection for the other device.

Embodiment 10. The method of any one of embodiments 1-9 wherein the wireless connection packet delay is a Quality of Service Class Identifier (QCI) packet delay configured for a radio bearer associated with the wireless connection and wherein the adjustment indication is indicative of an adjustment for the configured QCI packet delay.

Embodiment 11. The method of any one of embodiments 1-10 wherein the wireless device comprises a User Equipment (UE), the access node is an eNodeB and the wireless network is a Long-Term Evolution (LTE) network.

Embodiment 12. A wireless device adapted to operate according to the method of any one of embodiments 1 to 11.

Embodiment 13. A wireless device configured to operate in a wireless network via an access node, the wireless device comprising:
at least one transceiver; and
circuitry operable to:
measure an end-to-end packet trip delay for a packet flow established between the wireless device and another device; and
if the end-to-end packet trip delay measured does not meet an end-to-end packet trip delay target for the packet flow, sending an adjustment indication to the access node for adjusting a packet delay of a wireless connection between the wireless device and the access node via which the packet flow is established.

Embodiment 14. The wireless device of embodiment 13 wherein if the end-to-end packet trip delay measured is greater than the end-to-end packet trip delay target, the adjustment indication is indicative of a packet delay smaller than a predetermined packet delay configured for the wireless connection.

Embodiment 15. The wireless device of embodiment 13 or 14 wherein if the end-to-end packet trip delay measured is lower than the end-to-end packet trip delay target, the adjustment indication is indicative of a packet delay greater than a predetermined packet delay configured for the wireless connection.

Embodiment 16. The wireless device of any one of embodiments 13-15 wherein the circuitry is further operable to determine that the end-to-end packet trip delay measured does not meet the end-to-end packet trip delay target.

Embodiment 17. The wireless device of any of embodiments 13-16 wherein the end-to-end packet trip delay is a Real-Time Protocol (RTP) packet round trip delay.

Embodiment 18. The wireless device of any one of embodiments 13-17 wherein the packet flow is an RTP media flow.

Embodiment 19. The wireless device of any one of embodiments 13-18 wherein the end-to-end packet trip delay comprises the wireless connection packet delay and at least one of a transport network packet delay and another wireless connection packet delay associated with a wireless connection for the other device.

Embodiment 20. The wireless device any one of embodiments 13-19 wherein the wireless connection packet delay is a Quality of Service Class Identifier (QCI) packet delay configured for a radio bearer associated with the wireless connection and wherein the adjustment indication is indicative of an adjustment for the configured QCI packet delay.

Embodiment 21. The wireless device of any one of embodiments 13-20 wherein the wireless device comprises a User Equipment (UE), the access node is an eNodeB and the wireless network is a Long-Term Evolution (LTE) network.

Embodiment 22. A wireless device comprising:
a measuring module operable to measure an end-to-end packet trip delay for a packet flow established between the wireless device and another device; and a sending module operable to, if the end-to-end packet trip delay measured does not meet an end-to-end packet trip delay target for the packet flow, send an adjustment indication to the access node for adjusting a packet delay of a wireless connection between the wireless device and the access node via which the packet flow is established.

Embodiment 23. The wireless device od example 22, further comprising a sending module operable to send an optimization indication.

Embodiment 24. A method for an access node connected to a wireless device in a wireless network for controlling an end-to-end packet trip delay of a packet flow established between the wireless communication and another device, the method comprising:
  receiving an adjustment indication from the wireless device for adjusting a packet delay of a wireless connection between the wireless device and the access node via which the packet flow is established, and
  adjusting the wireless connection packet delay based on the adjustment indication received and a quality of the wireless connection.

Embodiment 25. The method of embodiment 24 further comprising determining a quality of the wireless connection.

Embodiment 26. The method of any one of embodiments 24-25 wherein the adjusting comprises adjusting the wireless connection packet delay so that the end-to-end packet trip delay meets an end-to-end packet trip delay target for the packet flow.

Embodiment 27. The method of any one of embodiments 24-26 wherein the end-to-end packet trip delay is a Real-Time Protocol (RTP) packet round trip delay.

Embodiment 28. The method of any one of embodiments 24-27 wherein the packet flow is an RTP media flow.

Embodiment 29. The method of any one of embodiments 24-28 wherein the end-to-end packet trip delay comprises the wireless connection packet delay and at least one of a transport network packet delay and another wireless connection packet delay associated with a wireless connection for the other device.

Embodiment 30. The method of any one of embodiments 24-29 wherein the wireless connection packet delay is a Quality of Service Class Identifier (QCI) packet delay configured for a radio bearer associated with the wireless connection and wherein the adjustment indication is indicative of an adjustment for the configured QCI packet delay.

Embodiment 31. The method of any one of embodiments 24-30 wherein the wireless device comprises a User Equipment (UE), the access node is an eNodeB and the wireless network is a Long-Term Evolution (LTE) network.

Embodiment 32. The method of any one of embodiments 24-30 wherein the wireless device further sends an optimization indication.

Embodiment 33. An access node adapted to operate according to the method of any one of embodiments 24-32.

Embodiment 34. An access node configured to communicate with a wireless device in a wireless network, the access node comprising:
  at least one transceiver; and
  circuitry operable to:
    receive an adjustment indication from the wireless device for adjusting a packet delay of a wireless connection between the wireless device and the access node via which a packet flow between the wireless device and another device is established, and
    adjust the wireless connection packet delay based on the adjustment indication received and a quality of the wireless connection.

Embodiment 35. The access node of embodiment 34 wherein the circuitry is further operable to determine a quality of the wireless connection.

Embodiment 36. The access node of any one of embodiments 34-35 wherein the circuitry is further operable to adjust the wireless connection packet delay so that the end-to-end packet trip delay meets an end-to-end packet trip delay target for the packet flow.

Embodiment 37. The access node of any one of embodiments 34-36 wherein the end-to-end packet trip delay is a Real-Time Protocol (RTP) packet round trip delay.

Embodiment 38. The access node of any one of embodiments 34-37 wherein the packet flow is an RTP media flow.

Embodiment 39. The access node of any one of embodiments 34-38 wherein the end-to-end packet trip delay comprises the wireless connection packet delay and at least one of a transport network packet delay and another wireless connection packet delay associated with a wireless connection for the other device.

Embodiment 40. The access node of any one of embodiments 34-39 wherein the wireless connection packet delay is a Quality of Service Class Identifier (QCI) packet delay configured for a radio bearer associated with the wireless connection and wherein the adjustment indication is indicative of an adjustment for the configured QCI packet delay.

Embodiment 41. The access node of any one of embodiments 34-40 wherein the wireless device comprises a User Equipment (UE), the access node is an eNodeB and the wireless network is a Long-Term Evolution (LTE) network.

Embodiment 42. The access node of any one of embodiments 34-41 wherein the adjusting is further based on an optimization indication from the wireless device.

Embodiment 43. An access node configured to communicate with a wireless device in a wireless network, the access node comprising:
  a receiving module for receiving an adjustment indication from the wireless device for adjusting a packet delay of a wireless connection between the wireless device and the access node via which a packet flow between the wireless device and another device is established, and
  an adjusting module for adjusting the wireless connection packet delay based on the adjustment indication received and a quality of the wireless connection.

Those skilled in the art will recognize improvements and modifications to the embodiments of the present disclosure. All such improvements and modifications are considered within the scope of the concepts disclosed herein.

What is claimed is:

1. A method for a wireless device connected to an access node in a wireless network for controlling an end-to-end packet trip delay for a packet flow established between the wireless device and another device, the method comprising:
  measuring an end-to-end packet trip delay between the wireless device and the other device; and
  in response to determining the measured end-to-end packet trip delay does not meet an end-to-end packet trip delay target for the packet flow, sending an adjustment indication to the access node for adjusting a packet delay of a wireless connection between the wireless device and the access node over which the packet flow is transported, wherein the adjustment indication is not sent if the measured end-to-end packet trip delay is the same as in a most recently sent adjustment indication.

2. The method of claim 1 wherein if the end-to-end packet trip delay measured is greater than the end-to-end packet trip delay target, the adjustment indication is indicative of a packet delay smaller than a predetermined packet delay configured for the wireless connection.

3. The method of claim 1 wherein if the end-to-end packet trip delay measured is lower than the end-to-end packet trip delay target, the adjustment indication is indicative of a packet delay greater than a predetermined packet delay configured for the wireless connection.

4. The method of claim 1 further comprising sending an optimization indication to the access node, where the optimization indication indicates if the packet delay adjustment corresponds to at least one of the coverage enhancement or power saving.

5. The method of claim 1 further comprising sending an optimization indication to the access node indicating either one of a wireless device preference or requirement for optimizing the packet delay adjustment.

6. The method of claim 1 wherein the end-to-end packet trip delay is a Real-Time Protocol, RTP, packet round trip delay.

7. The method of claim 1 wherein the end-to-end packet trip delay comprises the wireless connection packet delay and at least one of a transport network packet delay and another wireless connection packet delay associated with a wireless connection for the other device.

8. The method of claim 1 wherein the wireless connection packet delay is a Quality of Service Class Identifier, QCI, packet delay configured for a radio bearer associated with the wireless connection and wherein the adjustment indication is indicative of an adjustment for the configured QCI packet delay.

9. The method of claim 1 wherein the wireless device comprises a User Equipment, UE, the access node is an eNodeB and the wireless network is a Long-Term Evolution, LTE, network.

10. A wireless device connected to an access node in a wireless network over a wireless connection that transports a packet flow established between the wireless device and another device, the wireless device comprising:
at least one transceiver; and
circuitry operable to:
measure an end-to-end packet trip delay between the wireless device and the other device; and
in response to determining the measured end-to-end packet trip delay does not meet an end-to-end packet trip delay target for the packet flow, send an adjustment indication to the access node to adjust a packet delay of the wireless connection between the wireless device and the access node, wherein the adjustment indication is not sent if the measured end-to-end packet trip delay is the same as in a most recently sent adjustment indication.

11. The wireless device of claim 10 wherein if the end-to-end packet trip delay measured is greater than the end-to-end packet trip delay target, the adjustment indication is indicative of a packet delay smaller than a predetermined packet delay configured for the wireless connection.

12. The wireless device of claim 10 wherein if the end-to-end packet trip delay measured is lower than the end-to-end packet trip delay target, the adjustment indication is indicative of a packet delay greater than a predetermined packet delay configured for the wireless connection.

13. The wireless device of claim 10 wherein the circuitry is further operable to determine that the end-to-end packet trip delay measured does not meet the end-to-end packet trip delay target.

14. The wireless device of claim 10 wherein the end-to-end packet trip delay is a Real-Time Protocol, RTP, packet round trip delay.

15. The wireless device of claim 10 wherein the packet flow is an RTP media flow.

16. The wireless device of claim 10 wherein the end-to-end packet trip delay comprises the wireless connection packet delay and at least one of a transport network packet delay and another wireless connection packet delay associated with a wireless connection for the other device.

17. The wireless device of claim 10 wherein the wireless connection packet delay is a Quality of Service Class Identifier, QCI, packet delay configured for a radio bearer associated with the wireless connection and wherein the adjustment indication is indicative of an adjustment for the configured QCI packet delay.

18. The wireless device of claim 10 wherein the wireless device comprises a User Equipment, UE, the access node is an eNodeB and the wireless network is a Long-Term Evolution, LTE, network.

19. A method for a wireless device connected to an access node over a wireless connection transporting a packet flow established between the wireless device and another device, the method comprising:
determining that a packet delay budget for the wireless connection is to be adjusted at the access node;
sending an adjustment information to the access node comprising an optimization indication and a corresponding adjustment value to apply for changing the packet delay budget wherein the adjustment indication is not sent if the measured packet delay budget is the same as in a most recently sent adjustment indication.

20. The method of claim 19, wherein the optimization indication indicates optimization for power saving operation and the corresponding adjustment value for changing the packet delay budget corresponds to an adjustment amount to be applied on current length of a Discontinuous Reception, DRX, cycle of the wireless connection.

21. The method of claim 19, wherein the optimization indication indicates optimization for coverage enhancement and the corresponding adjustment value for changing the packet delay budget corresponds to an adjustment amount to be applied on current number of repetitions in Transmission Time Interval, TTI, bundling of the wireless connection.

22. The method of claim 19, wherein the step of determining further comprises determining that a measured end-to-end packet trip delay does not meet an end-to-end packet trip delay target for the packet flow.

23. A method for an access node connected to a wireless device in a wireless network for controlling an end-to-end packet trip delay of a packet flow established between the wireless device and another device, the method comprising:
receiving an adjustment indication from the wireless device for adjusting a packet delay of a wireless connection between the wireless device and the access node over which the packet flow is transported, and
adjusting the packet delay of the wireless connection based on information included in the adjustment indication, wherein the adjustment indication is not received if the measured end-to-end packet trip delay is the same as in a most recently received adjustment indication.

24. The method of claim 23 further comprising determining a quality of the wireless connection.

25. The method of claim 23 wherein the adjusting comprises adjusting the wireless connection packet delay so that the end-to-end packet trip delay meets an end-to-end packet trip delay target for the packet flow.

26. The method of claim 23 wherein the end-to-end packet trip delay is a Real-Time Protocol (RTP) packet round trip delay.

27. The method of claim 23 wherein the end-to-end packet trip delay comprises the wireless connection packet delay and at least one of a transport network packet delay and another wireless connection packet delay associated with a wireless connection for the other device.

28. The method of claim 23 wherein the wireless connection packet delay is a Quality of Service Class Identifier, QCI, packet delay configured for a radio bearer associated with the wireless connection and wherein the adjustment indication is indicative of an adjustment for the configured QCI packet delay.

29. The method of claim 23 wherein the wireless device comprises a User Equipment, UE, the access node is an eNodeB and the wireless network is a Long-Term Evolution, LTE, network.

30. The method of claim 23, wherein the information included in the adjustment indication comprise an adjustment value to apply for changing the packet delay of the wireless connection.

31. The method of claim 30, wherein the adjustment value corresponds to an adjustment amount to be applied on current length of a Discontinuous Reception, DRX, cycle of the wireless connection.

32. The method of claim 30, wherein the adjustment value corresponds to an adjustment amount to be applied on current number of repetitions in Transmission Time Interval, TTI, bundling of the wireless connection.

33. An access node connected to a wireless device in a wireless network over a wireless connection that transports a packet flow established between the wireless device and another device, the access node comprising:
at least one transceiver; and
circuitry operable to:
receive an adjustment indication from the wireless device for adjusting a packet delay of the wireless connection, and
adjust the packet delay of the wireless connection based on information included in the adjustment indication, wherein the adjustment indication is not received if the measured end-to-end packet trip delay is the same as in a most recently received adjustment indication.

34. The access node of claim 33, wherein the information included in the adjustment indication comprise an adjustment value to apply for changing the packet delay of the wireless connection.

35. The access node of claim 34, wherein the adjustment value corresponds to an adjustment amount to be applied on current length of a Discontinuous Reception, DRX, cycle of the wireless connection.

36. The access node of claim 34, wherein the adjustment value corresponds to an adjustment amount to be applied on current number of repetitions in Transmission Time Interval, TTI, bundling of the wireless connection.

37. The access node of claim 33 wherein the wireless connection packet delay is a Quality of Service Class Identifier, QCI, packet delay configured for a radio bearer associated with the wireless connection and wherein the adjustment indication is indicative of an adjustment for the configured QCI packet delay.

38. The method of claim 1 wherein sending the adjustment indication to the access node comprises sending the adjustment indication from the wireless device to the access node via at least one of a Radio Resource Control (RRC) message and a Medium Access Control (MAC) Control Element (CE).

* * * * *